(12) United States Patent
Meng et al.

(10) Patent No.: US 11,003,972 B2
(45) Date of Patent: May 11, 2021

(54) LOCALIZING A VEHICLE'S CHARGING OR FUELING PORT—METHODS AND APPARATUSES

(71) Applicant: Intel Corporation, Santa Clara, CA (US)

(72) Inventors: Rufeng Meng, San Jose, CA (US); Javier Perez-Ramirez, North Plains, OR (US); Hassnaa Moustafa, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 195 days.

(21) Appl. No.: 16/020,740

(22) Filed: Jun. 27, 2018

(65) Prior Publication Data

US 2019/0050697 A1 Feb. 14, 2019

(51) Int. Cl.
*G06K 19/07* (2006.01)
*G06T 7/70* (2017.01)
(Continued)

(52) U.S. Cl.
CPC .......... *G06K 19/0723* (2013.01); *B60R 1/00* (2013.01); *G06K 19/07749* (2013.01);
(Continued)

(58) Field of Classification Search
CPC .......... G06K 19/0723; G06K 19/07749; G06T 7/70; B60R 1/00
(Continued)

(56) References Cited

U.S. PATENT DOCUMENTS

| 4,244,113 A * | 1/1981 | Hirmann | G01B 5/255 33/203.18 |
| 4,934,419 A * | 6/1990 | Lamont | B67D 7/145 141/94 |

(Continued)

FOREIGN PATENT DOCUMENTS

| CN | 104809718 A | * | 7/2015 |
| CN | 108688500 A | * | 10/2018 |

(Continued)

OTHER PUBLICATIONS

Derwent report for Chen et al (CN 108688500), Derwent Account # 2018850962, Derwent week 201876 (Year: 2018).*

(Continued)

*Primary Examiner* — John T Trischler
(74) *Attorney, Agent, or Firm* — Schwabe, Williamson & Wyatt, P.C.

(57) ABSTRACT

Automated methods and apparatuses for charging or fueling a vehicle include provision of a plurality of tags and a controller to a vehicle. The plurality of tags are respectively installed at a plurality of positions on a top face of a roof of the vehicle. The controller is configured to cause information about a charging or fueling port of the vehicle to be transmitted to a charging or fueling system of a charging or fueling station. The charging or fueling system, provided with a charging connector or fueling nozzle, and an imaging device, uses at least the information about the charging or fueling port and the plurality of positions of the plurality tags to determine a location of the charging or fueling port of the vehicle, to charge or fuel the vehicle.

22 Claims, 8 Drawing Sheets

US 11,003,972 B2

Page 2

(51) Int. Cl.
  *G06K 19/077* (2006.01)
  *B60R 1/00* (2006.01)
  *H02J 7/00* (2006.01)
  *G06K 9/32* (2006.01)
  *B60L 53/10* (2019.01)

(52) U.S. Cl.
  CPC .............. *G06T 7/70* (2017.01); *B60L 53/10* (2019.02); *B60W 2420/42* (2013.01); *G06K 2009/3225* (2013.01); *G06T 2207/30248* (2013.01); *G06T 2207/30252* (2013.01); *H02J 7/0027* (2013.01); *H02J 2310/46* (2020.01); *H02J 2310/48* (2020.01); *Y10S 901/47* (2013.01)

(58) Field of Classification Search
  USPC ......................................................... 320/109
  See application file for complete search history.

(56) References Cited

U.S. PATENT DOCUMENTS

| | | | |
|---|---|---|---|
| 5,461,298 A * | 10/1995 | Lara | B60L 53/36 320/109 |
| 6,338,008 B1 * | 1/2002 | Kohut | B60S 5/02 235/381 |
| 6,343,241 B1 * | 1/2002 | Kohut | B60S 5/02 700/232 |
| 6,382,269 B1 * | 5/2002 | Tatsuno | B67D 7/0401 141/104 |
| 6,941,197 B1 * | 9/2005 | Murakami | B60L 53/305 701/22 |
| 7,045,783 B2 * | 5/2006 | Matveev | G01S 17/18 250/330 |
| 7,280,674 B2 * | 10/2007 | Matveev | G01S 7/51 382/104 |
| 7,948,376 B2 * | 5/2011 | DeLine | B67D 7/08 340/540 |
| 7,999,665 B2 * | 8/2011 | Chander | B60L 53/16 340/455 |
| 8,169,186 B1 * | 5/2012 | Haddad | B60L 53/65 320/109 |
| 8,179,245 B2 * | 5/2012 | Chander | B60Q 9/00 340/455 |
| 8,244,024 B2 * | 8/2012 | Dorrance | G01B 11/2755 382/151 |
| 8,393,362 B1 * | 3/2013 | Hollerback | B67D 7/0401 141/192 |
| 8,417,598 B2 * | 4/2013 | Pinkusevich | G06Q 20/10 705/34 |
| 8,853,999 B2 * | 10/2014 | Haddad | B60L 53/65 320/109 |
| 9,058,578 B2 * | 6/2015 | Jones | G06Q 10/0631 |
| 9,103,655 B2 * | 8/2015 | Enthaler | B60L 53/38 |
| 9,293,932 B2 * | 3/2016 | Ohtomo | H02J 7/0047 |
| 9,321,363 B2 * | 4/2016 | Yamamaru | B60L 11/1818 |
| 9,592,742 B1 * | 3/2017 | Sosinov | G05D 1/0225 |
| 9,604,641 B2 * | 3/2017 | Al-Stouhi | B60W 10/04 |
| 9,779,365 B2 * | 10/2017 | Smullin | G06Q 10/02 |
| 9,787,950 B2 * | 10/2017 | King | H04N 7/183 |
| 9,834,104 B2 * | 12/2017 | Tsukamoto | B60L 53/60 |
| 9,881,432 B2 * | 1/2018 | McQuade | H04L 63/107 |
| 9,971,351 B2 * | 5/2018 | Deutscher | G05D 1/0236 |
| 10,024,664 B1 * | 7/2018 | Gill | G01C 21/00 |
| 10,106,048 B2 * | 10/2018 | Haddad | B60L 53/665 |
| 10,135,530 B2 * | 11/2018 | Roberts | H04B 10/116 |
| 10,139,817 B2 * | 11/2018 | High | B64C 39/024 |
| 10,180,333 B2 * | 1/2019 | Jackson | G01C 21/3682 |
| 10,227,017 B2 * | 3/2019 | Bae | G05D 1/0246 |
| 10,306,189 B2 * | 5/2019 | King | H04N 7/183 |
| 10,308,168 B2 * | 6/2019 | Salter | B60Q 1/0035 |
| 10,349,060 B2 * | 7/2019 | Varadarajan | H04N 19/17 |
| 10,369,890 B1 * | 8/2019 | Sosinov | B60L 53/12 |
| 10,399,461 B1 * | 9/2019 | Sosinov | B60L 53/14 |
| 10,427,304 B2 * | 10/2019 | Leary | B60L 53/36 |
| 10,489,998 B2 * | 11/2019 | McQuade | G07F 11/002 |
| 10,525,845 B2 * | 1/2020 | Pursifull | B60L 53/14 |
| 10,536,026 B2 * | 1/2020 | Gerhold | H02J 7/35 |
| 10,551,502 B2 * | 2/2020 | Buehs | B60L 53/36 |
| 10,559,202 B2 * | 2/2020 | Yang | G06K 9/00369 |
| 10,562,406 B2 * | 2/2020 | Williams | B60L 58/12 |
| 10,576,833 B2 * | 3/2020 | Malek | B60L 11/1827 |
| 2003/0193980 A1 * | 10/2003 | Matveev | G01S 17/89 372/69 |
| 2003/0193981 A1 * | 10/2003 | Matveev | B60Q 1/1415 372/69 |
| 2003/0198271 A1 * | 10/2003 | Matveev | B60Q 1/14 372/92 |
| 2004/0133376 A1 * | 7/2004 | Uffenkamp | G01D 18/00 702/104 |
| 2005/0041847 A1 * | 2/2005 | Dorrance | G06T 7/70 382/141 |
| 2006/0273926 A1 * | 12/2006 | Schwartz | G08G 1/07 340/907 |
| 2008/0036862 A1 * | 2/2008 | Lang | H04N 7/181 348/156 |
| 2008/0186383 A1 * | 8/2008 | Dorrance | G06T 7/70 348/148 |
| 2010/0228405 A1 * | 9/2010 | Morgal | B62H 3/02 701/2 |
| 2011/0254504 A1 * | 10/2011 | Haddad | B60L 53/665 320/109 |
| 2011/0285850 A1 * | 11/2011 | Lu | B60Q 1/1423 348/148 |
| 2012/0031939 A1 * | 2/2012 | Jutila | B60Q 1/24 224/326 |
| 2012/0126748 A1 * | 5/2012 | Haddad | B60L 53/65 320/109 |
| 2012/0185379 A1 * | 7/2012 | Tu | B60L 53/665 705/39 |
| 2012/0286730 A1 * | 11/2012 | Bonny | B60L 53/665 320/109 |
| 2012/0320206 A1 * | 12/2012 | Sim | H04N 5/222 348/148 |
| 2013/0338820 A1 * | 12/2013 | Corbett | B60L 53/14 700/232 |
| 2014/0035565 A1 * | 2/2014 | Enthaler | B60L 50/52 324/207.17 |
| 2014/0176069 A1 * | 6/2014 | Ohtomo | H02J 7/0047 320/109 |
| 2014/0267741 A1 * | 9/2014 | King | H04N 7/183 348/156 |
| 2014/0327778 A1 * | 11/2014 | McQuade | H04L 63/107 348/156 |
| 2015/0002094 A1 * | 1/2015 | Haddad | B60L 53/665 320/109 |
| 2015/0073642 A1 * | 3/2015 | Widmer | G01C 21/36 701/22 |
| 2015/0185322 A1 * | 7/2015 | Haegermarck | G05D 1/0248 700/259 |
| 2015/0202975 A1 * | 7/2015 | Solomon | G06Q 10/06316 705/7.26 |
| 2016/0012657 A1 * | 1/2016 | Reineccius | G06Q 20/22 705/39 |
| 2016/0023762 A1 * | 1/2016 | Wang | B64F 1/00 701/3 |
| 2016/0039541 A1 * | 2/2016 | Beardsley | G05D 1/0088 701/2 |
| 2016/0091899 A1 * | 3/2016 | Aldred | G05D 1/0225 701/23 |
| 2016/0144735 A1 * | 5/2016 | Haddad | B60L 53/665 320/109 |
| 2016/0221816 A1 * | 8/2016 | Pollock | B67D 7/348 |
| 2017/0069152 A1 * | 3/2017 | McQuade | H04L 63/107 |
| 2017/0083988 A1 * | 3/2017 | Butsch | G06Q 50/06 |
| 2017/0151883 A1 * | 6/2017 | Bae | B60L 53/37 |
| 2017/0161902 A1 * | 6/2017 | Patil | B60Q 9/00 |
| 2017/0212237 A1 * | 7/2017 | Buehs | B60L 53/36 |
| 2017/0225581 A1 * | 8/2017 | Chai | B60L 11/1827 |
| 2017/0263015 A1 * | 9/2017 | Teo | G06F 3/038 |

(56) References Cited

U.S. PATENT DOCUMENTS

| | | | |
|---|---|---|---|
| 2018/0035083 A1* | 2/2018 | King | H04N 7/183 |
| 2018/0045533 A1* | 2/2018 | Jackson | G01C 21/3682 |
| 2018/0050800 A1* | 2/2018 | Boykin | H04N 5/23206 |
| 2018/0056801 A1* | 3/2018 | Leary | B25J 9/1692 |
| 2018/0087910 A1* | 3/2018 | Salehi | H04W 4/02 |
| 2018/0141450 A1* | 5/2018 | Oh | G01S 17/88 |
| 2018/0198525 A1* | 7/2018 | Roberts | H04B 10/116 |
| 2018/0304801 A1* | 10/2018 | Salter | B60Q 1/0035 |
| 2018/0321776 A1* | 11/2018 | Averyanov | G06T 19/006 |
| 2018/0339456 A1* | 11/2018 | Czinger | G05B 19/4189 |
| 2018/0341812 A1* | 11/2018 | Floor | G06K 9/00771 |
| 2018/0357791 A1* | 12/2018 | Dworakowski | G06T 7/73 |
| 2019/0001831 A1* | 1/2019 | Schutz | B60L 11/1835 |
| 2019/0007690 A1* | 1/2019 | Varadarajan | G06K 9/00744 |
| 2019/0031036 A1* | 1/2019 | Haddad | B60L 53/14 |
| 2019/0039473 A1* | 2/2019 | Takehara | B60L 53/665 |
| 2019/0043261 A1* | 2/2019 | Perez-Ramirez | G01S 11/12 |
| 2019/0043351 A1* | 2/2019 | Yang | G06K 9/00771 |
| 2019/0047149 A1* | 2/2019 | Wouhaybi | B25J 9/163 |
| 2019/0050049 A1* | 2/2019 | Qawami | H04N 19/156 |
| 2019/0056724 A1* | 2/2019 | High | B64D 1/22 |
| 2019/0096080 A1* | 3/2019 | Liu | G06T 7/74 |
| 2019/0111842 A1* | 4/2019 | Batur | B60T 7/22 |
| 2019/0139340 A1* | 5/2019 | McQuade | H04N 7/183 |
| 2019/0202313 A1* | 7/2019 | Haddad | B60L 53/14 |
| 2019/0217715 A1* | 7/2019 | Christen | B60L 53/665 |
| 2019/0272666 A1* | 9/2019 | Chapman | G06T 7/579 |
| 2019/0286118 A1* | 9/2019 | Bando | B62D 15/02 |
| 2019/0308587 A1* | 10/2019 | Salter | B60R 25/31 |
| 2019/0340782 A1* | 11/2019 | Sinha | B60L 53/37 |
| 2019/0381908 A1* | 12/2019 | Joo | B60L 53/30 |
| 2020/0031248 A1* | 1/2020 | Kwak | B60L 53/16 |
| 2020/0077859 A1* | 3/2020 | Nien | B60L 53/37 |

FOREIGN PATENT DOCUMENTS

| | | | | |
|---|---|---|---|---|
| EP | 3157255 A1 * | 4/2017 | | H04N 17/002 |
| JP | 02183902 A * | 7/1990 | | |
| JP | 06031598 A * | 2/1994 | | |
| WO | WO-2008143155 A1 * | 11/2008 | | B60L 50/16 |

OTHER PUBLICATIONS

Justinas Miseiki et al., "3D Vision Guided Robotic Charging Station for Electric and Plug-in Hybrid Vehicles", Mar. 15, 2017, 6 pages.

Toshiya Tanaka et al., "New Position Detection Method using Image Sensor and Visible Light LEDs", 2009 Second International Conference on Machine Vision, 4 pages.

Hyungan Oh et al., "An RFID Localization Algorithm for a Plug-In Electric Vehicle Recharging Robot", 2015 IEEE International Conference on Consumer Electronics (ICCE), 2 pages.

"E-smartConnect: Volkswagen is conducting a research on an automated quick-charging system for the next generation of electric vehicles", 2018, 2 pages, https://www.volswagen-media-services.com/en/hilfe.

Richard D. Roberts, A MIMO Protocol for Camera Communications (CamCom) using Undersampled Frequency Shift On-Off Keying (UFSOOK), 2013, 6 pages, Globcome 2013 Workshop—Optical Wireless Communications, Hillsboro, Oregon.

* cited by examiner

LOCALIZING A VEHICLE'S CHARGING OR FUELING PORT—METHODS AND APPARATUSES

TECHNICAL FIELD

The present disclosure relates to the fields of computer assisted or autonomous driving, in particular, methods and apparatuses associated with automated localization of a vehicle's charging or fueling port.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

In today's Automotive industry, fueling/charging always requires human interaction with the vehicles. With the arrival of computer-assisted or autonomous driving (CA/AD) vehicles, automation of this process, that is, with no or virtually no human intervention, is desired. A number of vision and/or radio frequency identifier (RFID) based approaches have been proposed. For example, in Miseikis, Justinas, et al. "3D Vision Guided Robotic Charging Station for Electric and Plug-in Hybrid Vehicles." arXiv: 1703.05381 (2017), a 3D vision guided robotic charging station based on image matching for identifying ports was described. As a further example, in Tanaka, Toshiya, and Shinichro Haruyama, "New position detection method using image sensor and visible light LEDs," IEEE Second International Conference on Machine Vision, 2009, a visual tag-based position detection system by identifying colorful tags was proposed. As still a further example, Oh, Hyungan, et al. "An RFID localization algorithm for a plug-in electric vehicle recharging robot." IEEE International Conference on Consumer Electronics (ICCE), 2015, a RFID based approach was described. (IEEE=Institute of Electrical and Electronic Engineer).

The conventional vision based solutions have at least the following limitations:
  Vision systems tend to require prior knowledge of the visual tags' positions.
  In some set ups, vision based solutions tend to rely on the precise parking of the vehicles.
  Identification of vehicle's position and ports based on computer vision algorithms can be affected by illumination conditions and the relative position between the vehicle and the vision system.
RFID-based solutions, on the other hand, tend to have the following limitations:
  In many cases, the solution appears not scalable since it requires the installation of many RFID tags around each port (which makes it a less practical solution).
  The efficiency of searching the ports as well as the accuracy of port localization tend to be low.
For electric vehicles, in theory, they may be charged wirelessly, however no practical solutions appear to have been proposed to-date.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

The present disclosure presents automated methods and apparatuses for charging or fueling a vehicle. As noted earlier, in the age of CA/AD vehicles, it is desirable that the process for charging or fueling vehicles be further automated, requiring less or no human intervention. In accordance with the present disclosure, complementary teachings of the automated charging or fueling methods and apparatuses are provided to the CA/AD system of a vehicle and to the charging or fueling system of a charging or fueling system station.

On the vehicle side, the CA/AD system of a vehicle having a charging or fueling port, is provided with an apparatus having a plurality of tags and a controller. The plurality of tags are respectively installed at a plurality of positions on a top face of a roof of the vehicle. The controller is provided to the CA/AD system. The controller is configured to cause information about the charging or fueling port of the vehicle to be transmitted (e.g., via an optical communication interface, such as a LED tag) to the charging or fueling system of the charging or fueling station, e.g., as part of a profile of the CA/AD vehicle. Accordingly, the charging or fueling system uses at least the information about the charging or fueling port and detection of the plurality of positions of the plurality tags to determine a location of the charging or fueling port of the vehicle, to charge or fuel the vehicle.

On the charging or fueling station side, the charging or fueling system is provided with at least a charging connector or a fueling nozzle, and an imaging device. The imaging device is configured to capture a video with one or more images of the roof of a vehicle, with the plurality of tags disposed thereon at a plurality of positions. The one or more images of the roof of the vehicle are analyzed to determine the plurality of positions of the tags, and the determined positions of the tags are used in conjunction with information about the charging or fueling port, to determine a location of the charging or fueling port of the vehicle, to charge or fuel the vehicle with the charging connector or a fueling nozzle.

In some embodiments, the charging or fueling station further includes a controller. The controller is coupled to the imaging device to receive and analyze the images of the roof of the vehicle to determine the plurality of positions of the tags, and use information about the charging or fueling port and the determined positions of the tags to determine the location of the charging or fueling port of the vehicle, to charge or fuel the vehicle.

In some embodiments, the tags are optical tags, e.g., light emitting diode (LED) tags. In some embodiments, the optical tags are also used to transmit information about the charging or fueling port, e.g., in the form of a profile, to the charging or fueling system of the charging or fueling station. For some of these embodiments, the imaging device of the charging or fueling system may be a camera, and the profile information of the vehicle may be optically received through sensors integrated with the camera.

In some embodiments, the tags define a coordinate system of the vehicle, and the information about the charging or fueling port includes coordinates of the location of the charging or fueling port expressed in reference the coordinate system defined by the tags. Additionally, one or more tilt measures of the vehicle are provided to the charging or fueling system, e.g., as part of the profile. The charging or fueling system, having its own coordinate system defined with reference to the imaging device, is configured to use the tilt information, as well as detected misalignment of the actual heading of the vehicle with the axis of the coordinate system defined in the charging or fueling system, to adjust the imaging device, such that the two coordinate systems are aligned. The charging or fueling system is further configured to translate the coordinates of the location of the charging or fueling port expressed in reference the coordinate system defined by the tags to an expression in reference to the coordinate system of charging or fueling system, on alignment of the two coordinate systems. The charging or fueling system then uses the expression in reference to the coordinate system of the charging or fueling system to locate the charging or fueling port, and charge or fuel the vehicle.

The disclosed approach appears to overcome the limitations or disadvantages of the conventional vision and/or RFID based approaches. The disclosed approach will be further described below, in more detail, with references to the drawings.

In the description to follow, reference is made to the accompanying drawings, which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Operations of various methods may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiments. Various additional operations may be performed and/or described operations may be omitted, split or combined in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). For example, the phrase "detecting and/or correcting" means to cover any one of the scenarios of "detecting only," "detecting and correcting," or "correcting only."

The description may use the phrases "in an embodiment," "in embodiments," and other phrases of the like, which may each refer to one or more of the same or different embodiments. Furthermore, the terms "comprising," "including," "having," and the like, as used with respect to embodiments of the present disclosure, are synonymous.

As used hereinafter, including the claims, the term "controller" refers to, is a part of, or includes an Application Specific Integrated Circuit (ASIC), an electronic circuit, a programmable combinational logic circuit (e.g., field programmable gate arrays (FPGA)), or a processor (shared or dedicate) and memory (shared or dedicated) that execute a plurality of programming instructions of one or more software or firmware programs to provide the described functionality.

Figure 1:
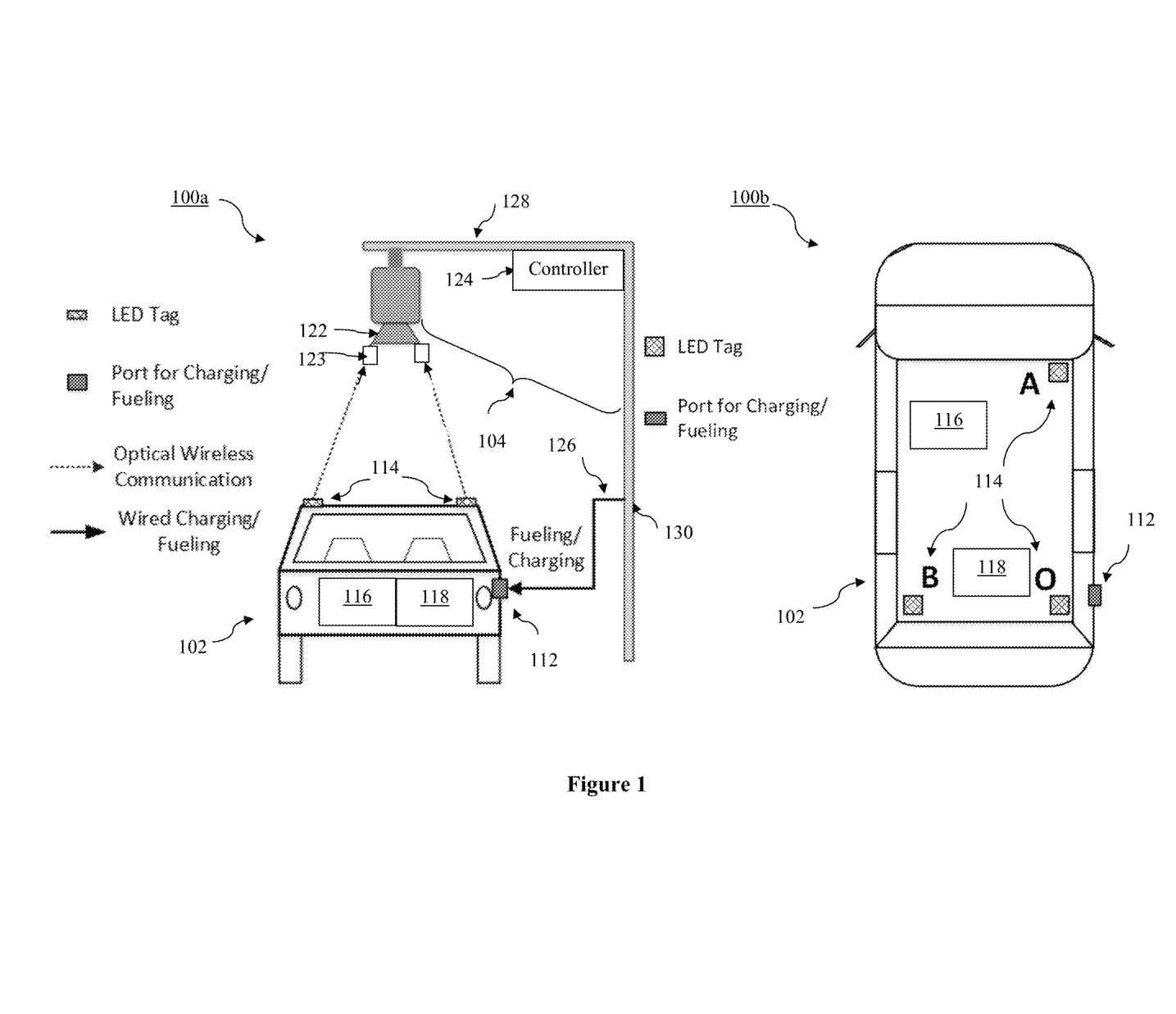
FIG. 1 illustrates a rear view and a top view of a vehicle incorporated with the automated charging or fueling technology of the present disclosure, in accordance with various embodiments.

Referring now to FIG. 1, wherein a rear view and a top view of a vehicle incorporated with the automated charging or fueling technology of the present disclosure, in accordance with various embodiments, are illustrated. Rear view 100*a* of vehicle 102 is shown on the left hand side of FIG. 1, while the top view 100*b* of vehicle 102 is shown on the right hand side of FIG. 1. Rear view 100*a* of vehicle 102 is also a side view of charging or fueling station having a charging or fueling system 104. The charging or fueling station may be an indoor or an outdoor station. The present technology can be implemented in either type of charging or fueling station.

As shown, vehicle 102 has a charging or fueling port 112 for charging or fueling. The location and characteristics (such as, shape, dimension, type, and so forth) depends on whether vehicle 102 uses gasoline/petroleum and/or electricity for fuel, and the make and/or model of the manufacturer. For example, for a gasoline/petroleum or hybrid vehicle, port 112 is typically an opening of a particular shape or size, configured to accept dispensing nozzles of particular types, sizes and/or shapes. For an electric vehicle, port 112 is typically a connector of a particular type, shape or size, configured to mate with another connector of a complementary type, size and/or shape. As will be appreciated by those skill in the art, for charging or fueling system 104 to be able to automate charging or fueling of vehicle 102, it is necessary for charging or fueling system 104 to automatically locate and identify characteristics of port 112 with precision, and without human intervention. Before further describing the automated charging or fueling technology of the present disclosure, while for ease of understanding, port 112 is consistently being illustrated at a rear right location of vehicle, it is anticipated that port 112 can be located in other locations of vehicle 102, e.g., at front right, front, front left, rear left or left. The disclosed technology works equally.

To enable such automated charging or fueling, vehicle 102 is provided with a plurality of tags 114 and a controller 116. Tags 114 are installed at a plurality of positions on an external surface of vehicle 102 such that they are visible to charging or fueling system 104. Tags 114 are used as reference points in describing the location of port 112 to charging or fueling system 104, as well as the heading of vehicle 102. Controller 116 is configured to provide a charging or fueling profile of vehicle 102 to charging or fueling system 104. The charging or fueling profile of vehicle 102 includes the description of the location of port 112 referencing tags 114, along with characteristics of port 112. Charging or fueling system 104 is configured to, in turn, use the description of the location of port 112 referencing tags 114, and detected positions of tags 114 to determine the location of port 112 in free space. Together, with the characteristics of port 112, charging or fueling system 104 is able to deploy an appropriate (compatible) charging connector or fueling nozzle 126 to the determined location in free space to charge or fuel vehicle 102.

For the illustrated embodiments of FIG. 1, charging or fueling system 104 includes charging connector or fueling nozzle 126 and imaging device 122. Imaging device 122 is configured to capture and generate a video of one or more images of the roof of vehicle 102 for use to determine the positions of tag 114 on vehicle 102, and in turn, the heading of vehicle 102.

For the illustrated embodiments of FIG. 1, charging or fueling system 104 further includes optional receivers 123 and controller 124. Receivers 123, when included, are configured to receive the charging or fueling profile of vehicle 102. Controller 124, when included, is configured to analyze the images of the roof of vehicle 102 to identify the positions of tag 114, and in turn, the heading of vehicle 102. Additionally, controller 124 is configured to use the description of the location of port 112 referencing tags 114, and the detected positions of tags 114 to determine the location of port 112 in free space. Still further, controller 124 is configured to use the determined location of port 112 in free space, and the characteristics of port 112 to deploy an appropriate (compatible) charging connector or fueling nozzle 126 to charge or fuel vehicle 102.

For the illustrated embodiments of FIG. 1, tags 114 are optical tags, e.g., light emitting diode (LED) tags, and imaging device 122 is a camera. Thus, an image frame generated by camera 122 includes images of the optical tags, allowing their positions to be determined. In alternate embodiments, tags 114 may be non-optical tags. Further, for the illustrated embodiments of FIG. 1, optical tags 114 are also used to optically and wirelessly transmit a charging or fueling profile of vehicle 102, from vehicle 102 to charging or fueling system 104. As described earlier, the charging or fueling profile includes in particular, the characteristics of port 112, and the location of port 112, described with references to optical tags 114. In at least some of the embodiments, the optical transmission of the profile may be in accordance with any predetermined optical communication protocol. Accordingly, for these embodiments, receivers 123 of charging or fueling system 104 are optical receivers configured to sense the optical light pulses modulated by optical tags 114. The use of LED tags may provide better communication between vehicle 102 and charging or fueling system 104 under various illumination conditions, in particular, in an indoor environment.

In at least some of the illustrated embodiments of FIG. 1, camera 122 may be a RealSense camera, and receivers 123 may be integrated with camera 122, and configured to be able to optically communicate with optical tags 114 in accordance with IEEE 802.15.7 based camera. In alternate embodiments where non-optical means, e.g., RF means such as Bluetooth®, Near Field Communication (NFC), WiFi, or Cellular, are used to transmit the profile instead, appropriate RF communication circuitry, i.e., Bluetooth®, Near Field Communication (NFC), WiFi, or Cellular may be provided to vehicle 102. In some of these embodiments, the RF communication circuitry may be existing RF communication circuitry already present in most vehicles.

Figure 3:
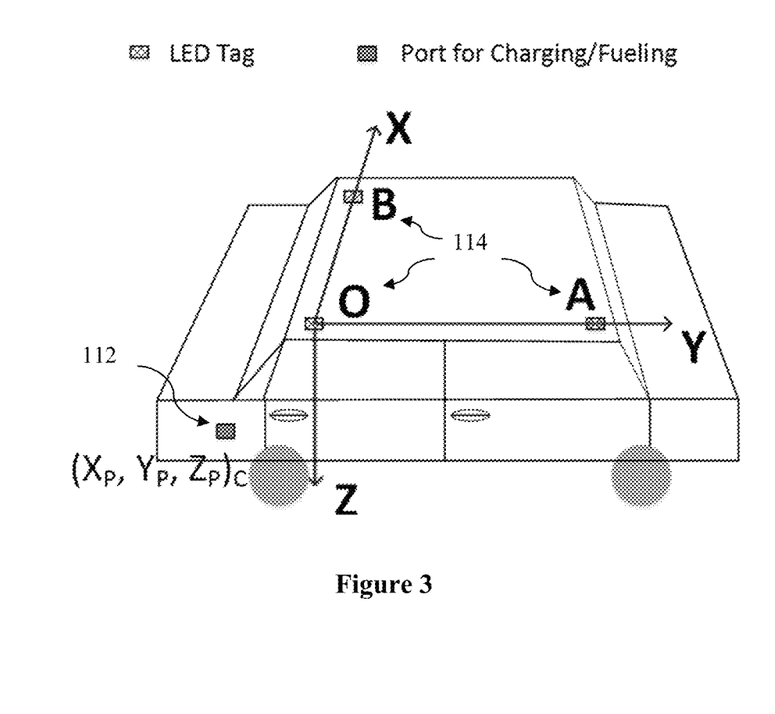
FIG. 3 illustrates a coordinate system defined by the tags of FIG. 1, in accordance with various embodiments.

Still referring to FIG. 1, for the illustrated embodiments, three (3) optical tags 114, e.g., LED tags 200, are provided. For ease of description/understanding, the three (3) optical tags 114 may be referred to (and depicted in the Figures) as the "O" tag, the "A" tag and the "B" tag. The 3 optical tags 114 are respectively installed at 3 corners of the top or roof surface of vehicle 102. Further, referencing also to FIG. 3, the 3 optical tags 114 serve to define a coordinate system of vehicle 102. The "O" tag serves as the original of this coordinate system (C) of vehicle 102. The imaginary line emanating from the "O" tag to the "B" tag defines the X-axis of the C coordinate system, and the imaginary line emanating from the "O" tag to the "A" tag defines the y-axis of the C coordinate system, which also defined the heading of vehicle 102. The imaginary line emanating from the "O" tag to the ground defines the Z-axis of the C coordinate system. Thus, the location of port 112 can be described with the coordinates $(X_p, Y_p, Z_p)_C$.

Figure 4:
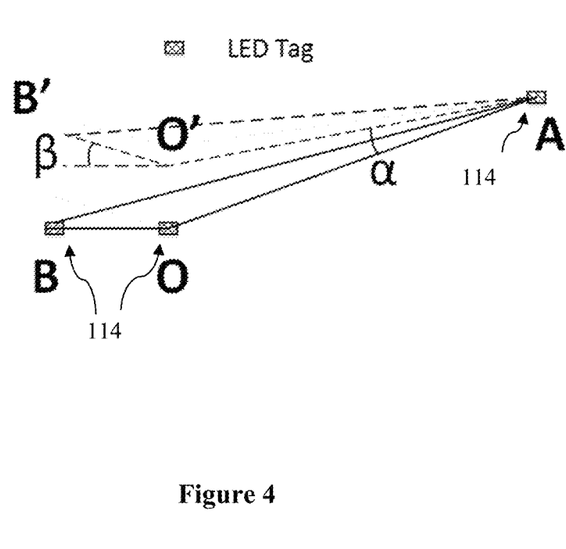
FIG. 4 illustrates an approach to measure tilting of the tag plane of the vehicle, in accordance with various embodiments.

Continuing to refer to FIG. 1, in at least some of the illustrated embodiments, to enable charging or fueling system 104 to more precisely identify the location of port 112 in free space, the charging or fueling profile of vehicle 102 provided to charging or fueling system 104 also includes one or more tilt measures of vehicle 102. The tilt measures, e.g., expressed in angular values, describes an amount of side-to-side and/or front-to-back tilting of vehicle 102. In particular, in various embodiments, the tilt measures may be represented by the angles α and β, as illustrated in FIG. 4. O' and B' depict the titled positions of the O and B tags in an example titled situation. The angle α can be used as a measure of the amount of front-to-back tilting of vehicle 102, whereas β can be used as a measure of the amount of side-to-side tilting of vehicle 102. The amount of side-to-side and/or front-to-back tilting of vehicle 102 may be due to load distribution of vehicle 102 or pressure differential between the tires of vehicle 102. For these embodiments, the charging or fueling profile of vehicle 102 may look as follows:

---
Port Info: (Type, Size)
Port - Tag Offsets $(X_p, Y_p, Z_p)_C$
Tilt: (α and β)
Tag distances: $\{d_{OA}, d_{OB}, \text{and } d_{AB}\}$
Tag Identification: {Description/Identification of Tag O, A and B}

---

In the embodiments where tags 114 are optical tags, and are also used to optically transmit the profile information of the vehicle, the Tag Identification field is used to provide the identifier of the optical tag doing the transmission, e.g., tag "O," tag "A," or tag "B."

Charging or fueling system 104, in particular, controller 124, would further factor into consideration the tilting of vehicle 102, and/or misalignment of the actual heading with the axis of the coordinate system defined in the charging or fueling system, when determining the location of port 112 in free space. In some embodiments, the amount of tilts may be measured or sensed by sensors 118, such as inertia sensors, of CA/AD vehicle 102.

In some embodiments, in addition to inertia sensors, sensors 118 may include a variety of other sensors, including, but are not limited to, light detection and ranging sensors (LiDAR), temperature and humidity sensors, accelerators, gyroscopes, cameras, and so forth.

Figure 2:
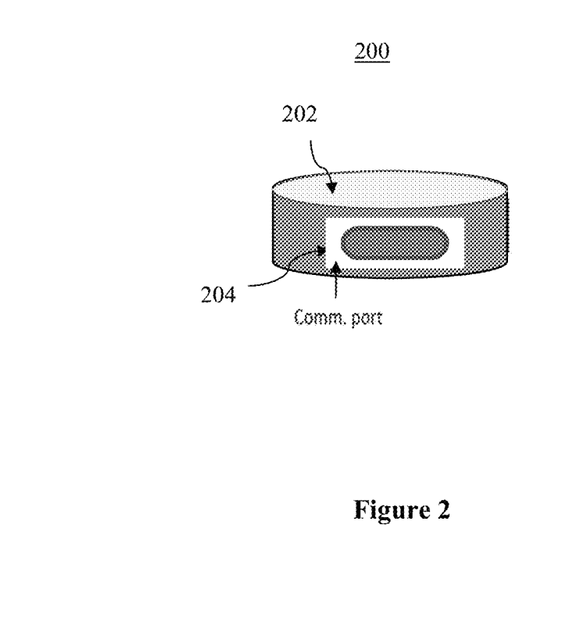
FIG. 2 illustrates a perspective view of one of the tags of FIG. 1, in accordance with various embodiments.

Referring now also to FIG. 2, wherein a perspective view of one of the roof tags of FIG. 1, in accordance with various embodiments, is shown. In particular, FIG. 2 illustrates an example LED tag 200, which may be used as tag 114 of FIG. 1. As shown, LED tag 200 includes LEDs 202 and optionally, a communication port 204. LEDs 202 are configured to emit or modulate lights to assist charging or fueling system 104 in determining the position of LED 200, as well as optically transmit the profile of vehicle 102 to charging or fueling system 104. In particular, in some embodiments, LEDs 202 are configured to enable optical communication in accordance with the IEEE 802.15.7 camera communication protocol. The various profile information may be optically and wirelessly communicated using various combinations of the waveforms of IEEE 802.15.7. In some embodiments, optional communication port 204 is configured to communicate with a CA/AD system of CA/AD vehicle 102.

For at least some of the embodiments of FIG. 2, LED tag 200 has a disc shape. In alternate embodiments, LED tag 200 may have other shapes, including, but are not limited to, rectangle, triangle, polygon, pentagon, hexagon, and so forth, or of different sizes. For examples, the size may be smaller for LED tags intended for compact vehicles with smaller roofs, or larger for LED tags intended for full size vehicles with larger roofs.

While for ease of understanding, only one communication port 204, in addition to the LEDs 202 are shown in FIG. 2, it should be noted that in alternate embodiments, for additional efficiencies and/or precisions, LED tag 200 may include additional communication ports and/or other circuitry. In at least some of the embodiments of FIG. 2, LED tag 200 may include a battery (not shown) to provide power for LEDs 202, and communication ports 204. In alternate embodiments, LED tag 200 may be powered by a power source of vehicle 102 instead.

Still referred to FIG. 1, for at least some of the illustrated embodiments of FIG. 1, imaging device 122 and optional receivers 123 (if provided) are arranged to be disposed at an end of overhang 128, allowing imaging device 122 (and optional receivers 123, if provided) to have a field of view or reception, looking down onto the roof of vehicle 102. For at least some of the illustrated embodiments of FIG. 1, optional controller 124 are also arranged to be proximally located with imaging device 122, at the same end of overhang 128. In alternate embodiments, controller 124 may be disposed at some other locations at the charging or fueling station. In still other embodiments, some or all of the functions of controller 124 may be disposed at an edge or a fog device, such as a gateway to a networking coupling charging or fueling system 104 to cloud services, or even on one or more remote cloud servers.

For at least some of the illustrated embodiments of FIG. 1, charging or fueling system 104 may include multiple nozzles or connectors of different types, shapes and/or sizes, at a location 130, with the appropriate (i.e. compatible) one to be selectively employed as the nozzle/connector 126 to use to charge or fuel vehicle 102.

Figure 5:
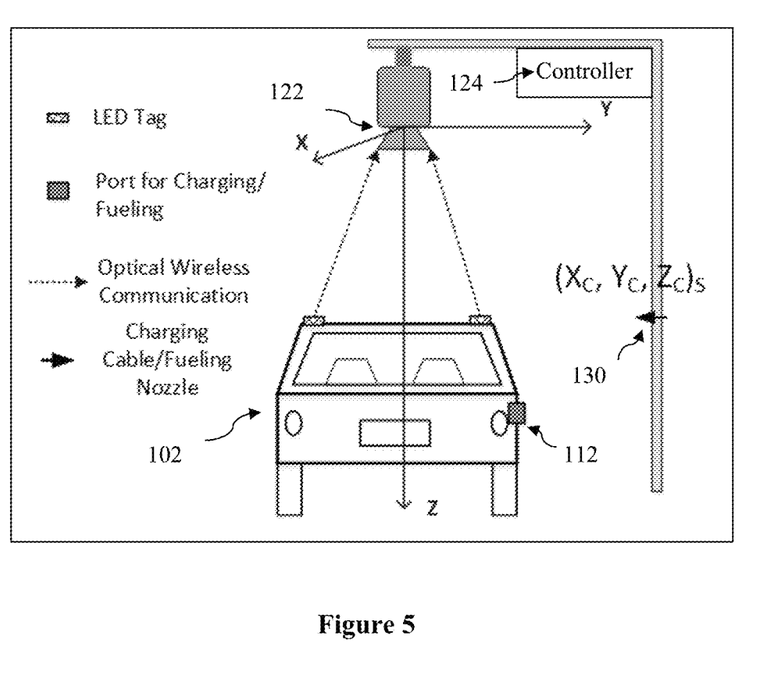
FIG. 5 illustrates a coordinate system of the charging or fueling system, in accordance with various embodiments.

Referring also to FIG. 5, in various embodiments, charging or fueling system 104 employs its own coordinate system (S) defined with imaging device 122 as the origin. For the illustrated embodiment, the X axis of the S coordinate system is in the typical heading of the vehicle pulling into the station, and the Y axis of the S coordinate system is perpendicular to the typical heading of the vehicle pulling in the station. The Z axis of the S coordinate system extends from imaging device 122 towards the ground. Thus, the location of the various nozzles or connectors may be defined by the coordinates $(X_c, Y_c, Z_c)_S$. Note that in alternate embodiments, the coordinate system (S) may be defined in other manners. For example, the X axis of the S coordinate system may be in the opposite direction of the typical heading of the vehicle instead. As still another example, the Y axis of the S coordinate system is in the typical heading of the vehicle instead. As still yet another example, the Z axis of the S coordinate system may extend from imaging device 122 towards the ceiling or sky instead. All permutations of these examples are possible.

Figure 6:
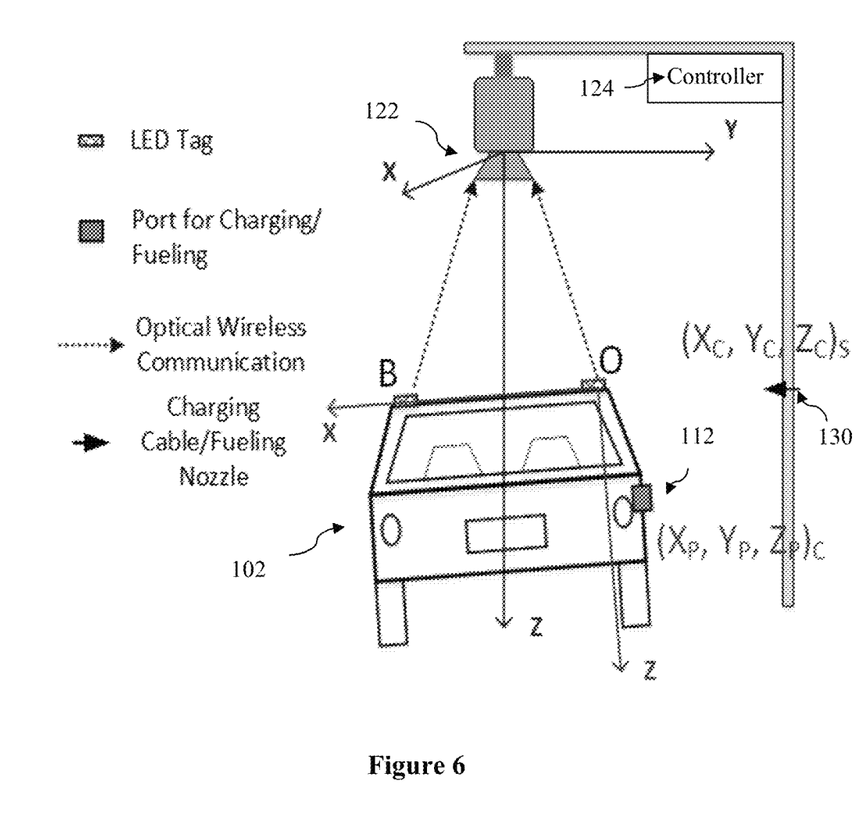
FIG. 6 illustrates both coordinate systems of the vehicle and the charging or fueling system, in accordance with the various embodiments.

FIG. 6 illustrates both coordinate systems of the vehicle and the charging or fueling system, in accordance with the various embodiments. As depicted, in most situations, because of front-to-back and/or side-to-side tilting caused by load balancing or differential tire pressures, the z-axis of the C coordinate system employed by vehicle 102 (e.g., to describe charging or fueling port 112) and the z-axis of the S coordinate system employed by charging or fueling system 104 (e.g., to describe the at rest location 130 of the charging connector or fueling nozzle 126 are not aligned.

Figure 7:
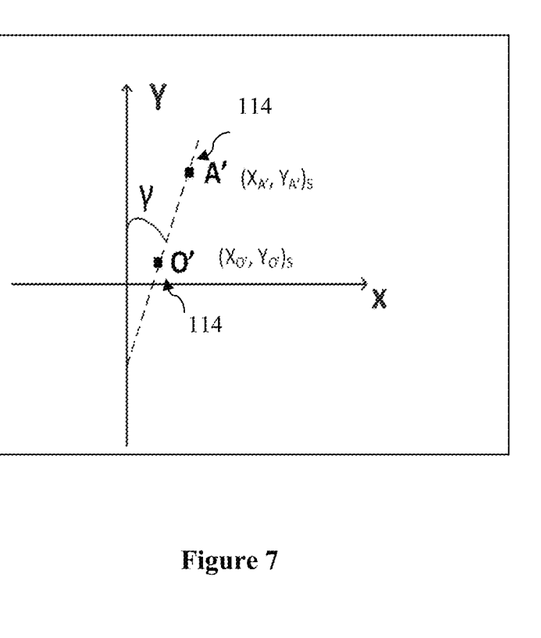
FIG. 7 illustrates misalignment of the actual heading of the vehicle with the axis of the coordinate system defined in the charging or fueling system, in accordance with various embodiments.

Similarly, the actual heading of vehicle 102 may not be perfectly aligned with the axis of the coordinate system defined in the charging or fueling system 104. The difference may be quantified by the angle γ as depicted in FIG. 7. In FIG. 7, A' and O' depict the positions of the A and O tag as captured in an image generated by imaging device 122. Using the coordinates in reference to the X and Y axes of the S coordinate system $(X_{A'}, Y_{A'})_S$ and $(X_{O'}, Y_{O'})_S$, the horizontal misalignment of the X and Y axes of the C and S coordinate systems, i.e., the angular value of γ can be computed, to be described more fully below.

Figure 8:
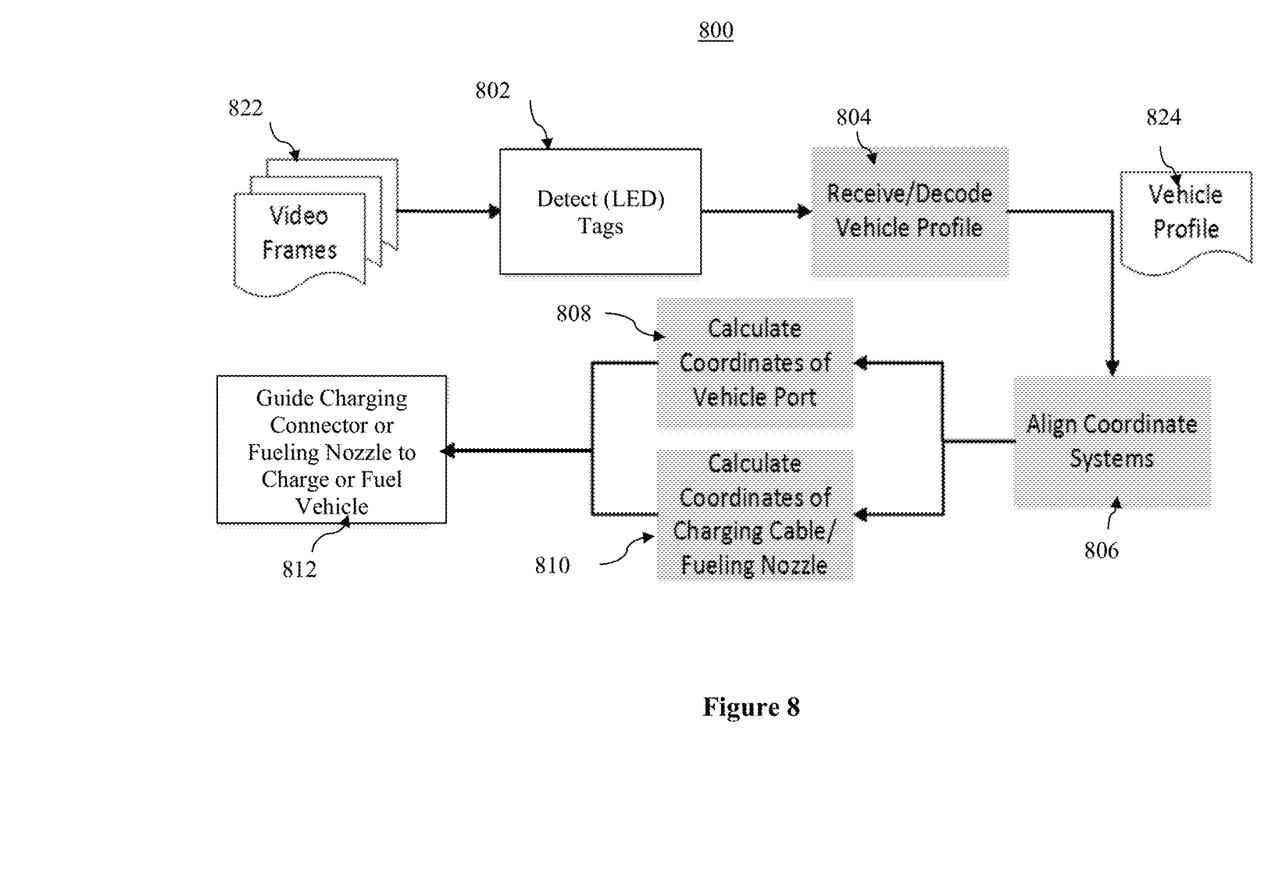
FIG. 8 illustrates a process to charge or fuel a vehicle, in accordance with various embodiments.

Referring now FIG. 8, wherein a process to automatically charge or fuel a vehicle, in accordance with various embodiments, is illustrated. As shown, process 800 for automatically charging or fueling a vehicle includes operations at blocks 802-812. In various embodiments, the operations at blocks 802-812 are performed by e.g., controller 124 of charging or fueling system 104. In alternate embodiments, process 800 may include more or less operations, or with some of the operations performed in different order.

Process 800 may begin at block 802. At block 802, image frames 822 of a vehicle pulled into a charging or fueling station having charging or fueling system 104, are received and analyzed to determine the positions of the tags installed at an external surface, such as the roof, of the vehicle. For the LED tag environments, the LED tags blink rapidly (i.e. turned on/off with a high frequency). The frequency the LED tags blink may be controlled by the controller connected to the LED tags. The LED tags manifest themselves as bright dots in the video frames. In embodiments, the camera may reduce its expose time, when capturing the video frames. In the video frames, the LED tags will be bright, and the rest of the world is relatively dark. Accordingly, the positions of the LED tags may be determined by recognizing the blinking bright dots in the image frames.

At block 804, profile 824 of the vehicle may be received and processed to extract information about the charging or fueling port of the vehicle. In various embodiments, profile 824 is also processed to extract characteristics, such as type, shape and/or size of the charging or fueling port of the vehicle, distances between the tags, as well as tilt measures of the vehicle. Recall, in embodiments, the "blinking" patterns of the LED tags are employed to transmit vehicle profile. The controller analyzes the image frames to see how the LED tags are blinking. (Because each LED tag is blinking, so in some image frames, it is off, and in next a few frames, it is on, and so on so forth.) In embodiments, two systems (i.e. the system in CA/AD vehicle and the fueling/charging system) encode and decode vehicle profile by following predefined protocol. That is, the controller associated with the image device knows how the controller of the LED tags is encoding the vehicle profile into the "blinking" of the LED tags.

Next, at block 806, the field of view of the imaging device is adjusted to align the (C) coordinate system of the vehicle and the (S) coordinate system of the charging or fueling system. To align the two coordinate systems, first, an amount of adjustment in the X and Y directions of the S coordinate system is determined and made, based on the tilt measures provided in profile 824 of vehicle, to align the Z axis of the two coordinate systems. Then, the field of view is further rotated around the Z axis to compensate for the angle γ (FIG. 7), which is the misalignment between the actual heading of the vehicle with the axis of the coordinate system defined in the charging or fueling system. Angle γ can be computed as follows:

$$\gamma = \tan^{-1} \frac{(X_{A'} - X_{O'})_S}{(Y_{A'} - Y_{O'})_S} \quad (1)$$

Figure 9:
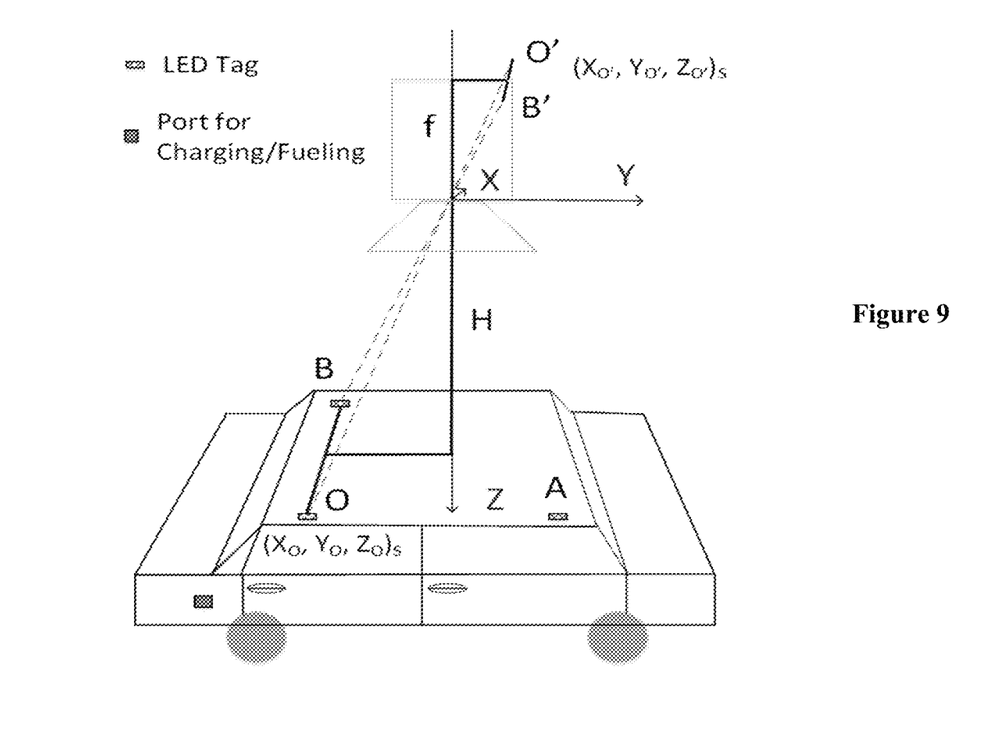
FIG. 9 illustrates an approach to calculate the location of the charging or fueling port of the vehicle with reference to the coordinate system of the charging or fueling system, in accordance with various embodiments.

At block 808, the coordinates of the charging or fueling ports 112 are calculated. In some embodiments, the coordinates of tag O are first calculated. FIG. 9 illustrates the relationship between the tags and their visual representations in the images 822 received. The quantity H in FIG. 9 denotes the distance between the origin of coordinate system S and the roof plane where the tags are disposed. Thus, the edge formed by tags O and B and the corresponding line in the images 822 received has the following relationship:

$$\frac{OB}{O'B'} = \frac{H}{f} \quad (2)$$

where f is the focal length of the imaging device of the charging or fueling system, a quantity known to controller 124 of the charging or fueling system. Recall the distance OB is included in the profile 824 provided.

In various embodiments, to determine the distance O'B', the coordinates $(X_{B'}, Y_{B'})$ of B' in terms of number of pixels in images 822 are first determined. Next, the distance O'B' in terms of number of pixels is calculated. Finally, the actual physical length of O'B' is determined by multiplying the number of pixels by the pixel size of the generating imaging device of images 822. With the values of OB, O'B' and f, the value of H can be calculated as follows:

$$H = \frac{OB}{O'B'} \times f \quad (3)$$

Assuming the coordinates of tag O in coordinate system S is $(X_o, Y_o, Z_o)_S$. The coordinates of tag O and the coordinates of its corresponding O' in images 822 satisfy the following equation:

$$\frac{|X_O|}{|X_{O'}|} = \frac{H}{f} \quad (4)$$

$$\frac{|Y_O|}{|Y_{O'}|} = \frac{H}{f} \quad (5)$$

Thus, the values $|X_o|$ and $|Y_o|$ can be calculated as follows:

$$|X_O| = \frac{H}{f} \times |X_{O'}| = \frac{OB}{O'B'} \times |X_{O'}| \quad (6)$$

$$|Y_O| = \frac{H}{f} \times |Y_{O'}| = \frac{OB}{O'B'} \times |Y_{O'}| \quad (7)$$

After calculating $(X_o, Y_o, Z_o)_S$, the coordinates of tag O in coordinate system S, both the coordinates of the position of tag O and the 3D offsets $(X_p, Y_p, Z_p)_C$ of charging or fueling port 112 are now known. Accordingly, the coordinates of charging or fueling port 112 in coordinate system S can now be calculated as $(X_o+X_p, Y_o+Y_p, Z_0+Z_p)_S$.

At block 810, the coordinates of charging or fueling nozzle are calculated. Recall the coordinates of charging connector or fueling nozzle 126 are known to controller 124, but the coordinates are measured with respect to coordinate system S prior to its rotation to compensate for the tilt of vehicle 102 and misalignment of the actual heading with the axis of the coordinate system defined in the charging or fueling system. Accordingly, the coordinates of charging connector or fueling nozzle 126 under the rotated coordinate system S are calculated as follows (assuming clockwise rotation):

$$\begin{bmatrix} X'_C \\ Y'_C \\ Z'_C \end{bmatrix} = R_Z(\gamma) \times R_Y(\beta) \times R_X(\alpha) \times \begin{bmatrix} X_C \\ Y_C \\ Z_C \end{bmatrix} \quad (8)$$

where the rotations $R_Z(\gamma)$, $R_Y(\beta)$, and $R_X(\alpha)$ can be expressed as follows:

$$R_X(\alpha) = \begin{bmatrix} 1 & 0 & 0 \\ 0 & \cos\alpha & -\sin\alpha \\ 0 & \sin\alpha & \cos\alpha \end{bmatrix} \quad (9)$$

$$R_Y(\beta) = \begin{bmatrix} \cos\beta & 0 & \sin\beta \\ 0 & 1 & 0 \\ -\sin\beta & 0 & \cos\beta \end{bmatrix} \quad (10)$$

$$R_Z(\gamma) = \begin{bmatrix} \cos\gamma & -\sin\gamma & 0 \\ \sin\gamma & \cos\gamma & 0 \\ 0 & 0 & 1 \end{bmatrix} \quad (11)$$

In alternate embodiments, the coordinates of charging connector or fueling nozzle 126 under the rotated coordinate system S may be calculated under a counter-clockwise rotation assumption instead, with $R_Z(\gamma)$, $R_Y(\beta)$, and $R_X(\alpha)$ adjusted accordingly.

Finally, at block 812, on determination of the location of the charging or fueling port of the vehicle, referencing the rotated coordinate system of the charging or fueling system, an appropriate (compatible) one of the charging or fueling nozzle is selected, and caused to be moved from its rest location to the determined location of the vehicle's charging or fueling port, to charge or fuel the vehicle.

Figure 10:
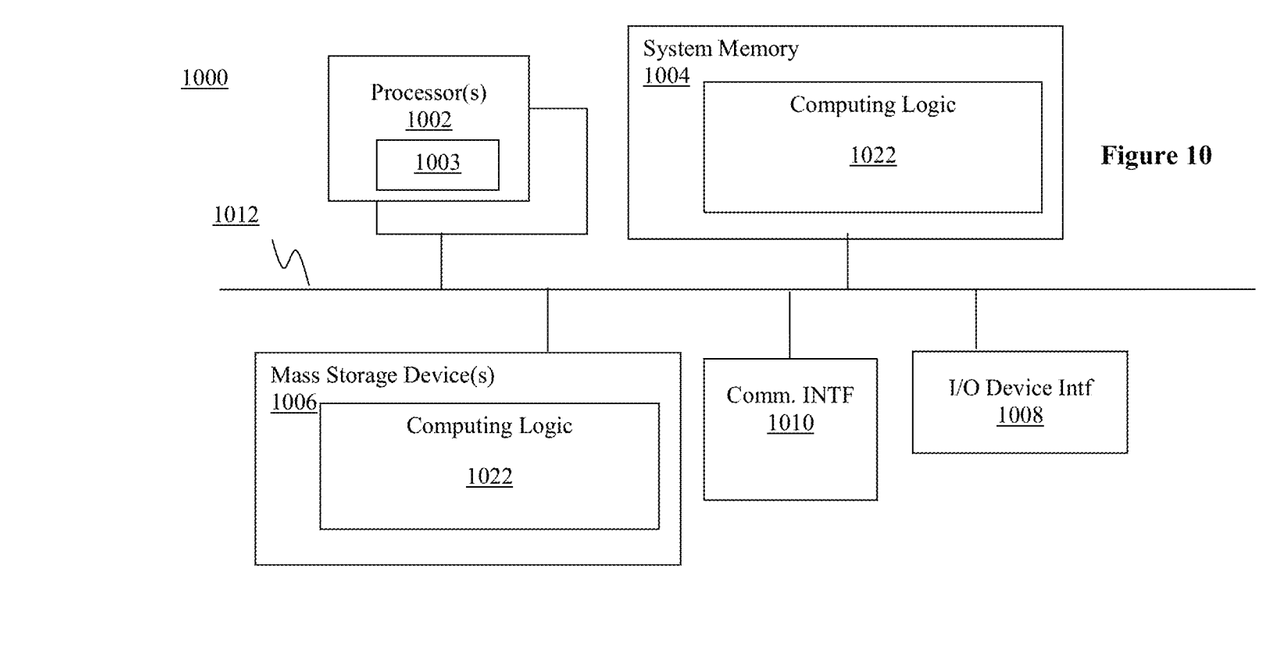
FIG. 10 illustrates an example computer system suitable for use with the vehicle or the charging or fueling system, in accordance with various embodiments.

FIG. 10 illustrates an example computer system suitable for use with the vehicle or the charging or fueling system, in accordance with various embodiments. As shown, in embodiments, computer device 1000 may include one or more processors 1002 and system memory 1004. Each processor 1002 may include one or more processor cores. In embodiments, one or more processors 1002 may include one or more hardware accelerators 403 (such as, FPGA). System memory 1004 may include any known volatile or non-volatile memory. Additionally, computer device 1000 may include mass storage device(s) 1006 (such as solid state drives), input/output device interface 1008 (to interface with input/output devices, such as, cameras, sensors and so forth) and communication interfaces 410 (such as serial interface, near field communication, network interface cards, modems and so forth). The elements may be coupled to each other via system bus 1012, which may represent one or more buses. In the case of multiple buses, they may be bridged by one or more bus bridges (not shown).

Each of these elements may perform its conventional functions known in the art. In particular, system memory 1004 and mass storage device(s) 1006 may be employed to store a working copy and a permanent copy of the executable code of the programming instructions implementing the operations described earlier, e.g., but are not limited to, operations associated with controller 112 of vehicle 102 and/or controller 124 of charging or fueling system 104 to provide automated localization of charging or fueling of a vehicle, denoted as computing logic 1022. The programming instructions of computing logic 1022 may comprise assembler instructions supported by processor(s) 1002 or high-level languages, such as, for example, C, that can be compiled into such instructions. In embodiments, some of the functions performed by controller 112 of vehicle 102 and/or controller 124 of charging or fueling system 104, i.e., some of computing logic 1022, may be implemented with hardware accelerator 1003 instead.

The permanent copy of the executable code of the programming instructions and/or the bit streams to configure hardware accelerator 1003 may be placed into permanent mass storage device(s) 1006 or hardware accelerator 1003 in the factory, or in the field, through, for example, a distribution medium (not shown), such as a compact disc (CD), or through communication interface 1010 (from a distribution server (not shown)).

Except for the use of computer device 1000 as controller 112 of vehicle 102 and/or controller 124 of charging or fueling system 104, the constitutions of the elements 1010-1012 are otherwise known, and accordingly will not be further described.

Figure 11:
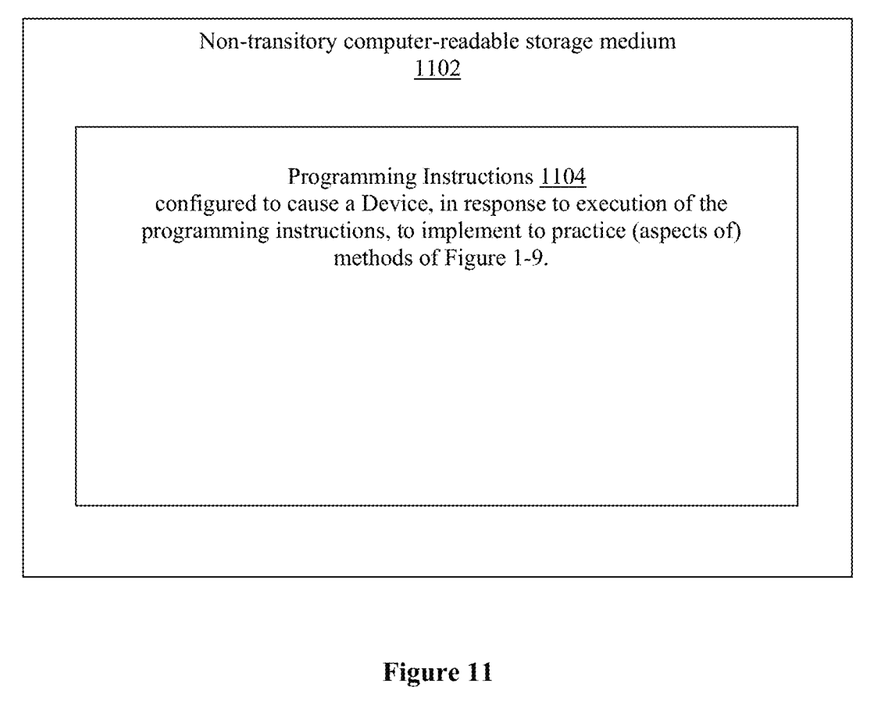
FIG. 11 illustrates a computer readable medium having instructions that in response to their execution cause the vehicle or the charging or fueling system to perform all or aspects of the operations described herein, in accordance with various embodiments.

FIG. 11 illustrates a computer readable medium having instructions that in response to their execution cause the vehicle or the charging or fueling system to perform all or aspects of the operations described herein, in accordance with various embodiments. As illustrated, non-transitory computer-readable storage medium 1102 may include the executable code of a number of programming instructions 1104. Executable code of programming instructions 1104 may be configured to enable a system, e.g., computer system 1000, in response to execution of the executable code/ programming instructions, to perform, e.g., various operations associated with controller 112 of vehicle 102 or controller 124 of charging or fueling system 104. That is, execution of programming instructions 1104 provide computer system 1000 with computing logic 1022. In alternate embodiments, executable code/programming instructions 1104 may be disposed on multiple non-transitory computer-readable storage medium 1102 instead. In still other embodiments, executable code/programming instructions 1104 may be encoded in transitory computer readable medium, such as signals.

In embodiments, a processor may be packaged together with a computer-readable storage medium having some or all of executable code of programming instructions 1104 configured to practice all or selected ones of the operations earlier described. For one embodiment, a processor may be packaged together with such executable code 1104 to form a System in Package (SiP). For one embodiment, a processor may be integrated on the same die with a computer-readable storage medium having such executable code 1104. For one embodiment, a processor may be packaged together with a computer-readable storage medium having such executable code 1104 to form a System on Chip (SoC). For at least one embodiment, the SoC may be utilized in, e.g., controller 112 of vehicle 102 or controller 124 of charging or fueling system 104.

Thus, methods and apparatuses for automated charging or fueling a vehicle have been described. Example embodiments described include, but are not limited to, Example 1 is an apparatus, comprising: a plurality of tags respectively disposed at a plurality of positions on a top face of a roof of a vehicle having a charging or fueling port; and a controller disposed in the vehicle to cause transmission of a profile of the vehicle to a charging or fueling system of a charging or fueling station, including information about the charging or fueling port; wherein the charging or fueling system uses at least the information in the profile about the charging or fueling port and the plurality of positions of the plurality tags to determine a location of the charging or fueling port of the vehicle, to charge or fuel the vehicle.

Example 2 is example 1, wherein the plurality of tags comprise optical tags.

Example 3 is example 2, wherein the plurality of optical tags are light emitting diode (LED) tags.

Example 4 is example 2, wherein the controller uses the optical tags to transmit the profile of the vehicle, including the information about the charging or fueling port to the charging or fueling system of the charging or fueling station.

Example 5 is example 1, wherein the plurality of tags comprise three (3) tags disposed at three (3) corners of the top surface of the roof of the vehicle.

Example 6 is example 1, wherein the information in the profile about the charging or fueling port includes the location of the charging or fueling port expressed in reference to the positions of the tags, and the charging or fueling system uses at least the location of the charging or fueling port expressed in reference to the positions of the tags, and the plurality of positions of the plurality tags to determine the location of the charging or fueling port of the vehicle in free space, to charge or fuel the vehicle.

Example 7 is example 1, wherein the profile of the vehicle includes a tilt measure of the vehicle, and the charging or fueling system uses at least the tilt measure of the vehicle, and the plurality of positions of the plurality of tags to determine the location of the charging or fueling port of the vehicle in free space, to charge or fuel the vehicle.

Example 8 is example 7, further comprising one or more inertia sensors coupled to the controller to generate inertia data for the controller to determine the tilt measure of the vehicle.

Example 9 is any one of examples 1-8, further comprising a computer-assisted or autonomous driving system, and the controller is part of the computer-assisted or autonomous driving system.

Example 10 is example 9, wherein the apparatus is the vehicle.

Example 11 is a charging or fueling system, comprising: a charging connector or a fueling nozzle; and an imaging device to capture one or more images of a roof of a vehicle, the roof having a top surface and a plurality of tags disposed thereon at a plurality of positions, and the vehicle having a charging or fueling port to charge or fuel the vehicle; wherein the one or more images of the roof of the vehicle are analyzed to determine the plurality of positions of the tags, and the determined positions of the tags are used in conjunction with information about the charging or fueling port, to determine a location of the charging or fueling port of the vehicle, to charge or fuel the vehicle with the charging connector or a fueling nozzle.

Example 12 is example 11, further comprising a controller coupled to the imaging device to receive and analyze the one or more images of the roof of the vehicle to determine the plurality of positions of the tags, and use the determined positions of the tags and the information about the charging or fueling port, received from the vehicle, to determine the location of the charging or fueling port of the vehicle, to charge or fuel the vehicle.

Example 13 is example 12, wherein the imaging device comprises a camera configured to capture the one or more images of the roof of the vehicle, and wherein sensors of the camera are further configured to optically receive the profile about the charging or fueling port from the vehicle.

Example 14 is example 13, wherein the tags are optical tags, and the camera is configured to configured to optically receive the information about the charging or fueling port from the optical tags of the vehicle Example 15 is example 12, further comprising one or more receivers to receive the information about the charging or fueling port, from the vehicle.

Example 16 is example 12, wherein the controller is to further adjust a field of view of the imaging device, such that a coordinate system of the charging or fueling system, defined based at least in part on a location or orientation of the field of view of the imaging device, is aligned with a coordinate system of the vehicle defined based at least in part on the positions of the tags.

Example 17 is example 16, wherein the profile of the vehicle further includes a tilt measure of the vehicle, and the controller is to adjust the field of view of the imaging device based at least in part on the tilt measure of the vehicle included with the received profile of the vehicle.

Example 18 is example 16, wherein the controller is to adjust the field of view of the imaging device based at least in part on a misalignment of an actual heading of the vehicle with an axis of the coordinate system defined in the charging or fueling system.

Example 19 is example 16, wherein the controller is to calculate coordinates of the charging or fueling port of the vehicle under the coordinate system of the charging or fueling system, on adjusting the field of view of the imaging device to align the two coordinate systems.

Example 20 is example 19, wherein to calculate coordinates of the charging or fueling port of the vehicle under the coordinate system of the charging or fueling system, the controller is to first calculate coordinates of one of the plurality of tags under the coordinate system of the charging or fueling system, the one tag being the tag that serves as the origin of the coordinate system of the vehicle.

Example 21 is example 20, wherein the information about the charging or fueling port included with the profile includes coordinates of the charging or fueling port expressed in reference to the plurality of tags, and to calculate coordinates of the charging or fueling port of the vehicle under the coordinate system of the charging or fueling system, the controller is to translate coordinates of the charging or fueling port expressed in reference to the plurality of tags, to coordinates under the coordinate system of the charging or fueling system, after alignment of the two coordinate systems.

Example 22 is at least one computer-readable medium (CRM) comprising a plurality of instructions, in response to execution of the instructions by a computer-assisted or autonomous driving (CA/AD) system of a CA/AD vehicle, to cause the CA/AD system to transmit a tilt measure of the CA/AD vehicle to a charging or fueling system of a charging or fueling station, wherein the charging or fueling system adjusts an imaging device of the charging or fueling system, based at least in part on the tilt measure, to align a coordinate system of the CA/AD vehicle defined with reference to a tag of the CA/AD vehicle, with a coordinate system of the charging or fueling system defined with reference to the imaging device, to automatically locate a charging or fueling port of the CA/AD vehicle to charge or fuel the CA/AD vehicle.

Example 23 is example 22, wherein the CA/AD system is further caused to transmit location information of the charging or fueling port of the CA/AD vehicle, expressed in terms of the coordinate system of the CA/AD vehicle; wherein the charging or fueling system translates the location information of the charging or fueling port, expressed in terms of the coordinate system of the CA/AD vehicle, to an expression in terms of the coordinate system of the charging or fueling system, after aligning the two coordinate systems.

Example 24 is at least one computer-readable medium (CRM) comprising a plurality of instructions, in response to execution of the instructions by a charging or fueling system of a charging or fueling station, to cause the charging or fueling system to adjust an imaging device of the charging or fueling system to cause a coordinate system of a computer-assisted or autonomous driving (CA/AD) vehicle defined with reference to tags of the CA/AD vehicle, and a coordinate system of the charging or fueling system defined with reference to an imaging device of the charging or fueling system to be aligned, the CA/AD vehicle to be charged or fueled by the charging or fueling system.

Example 25 is example 24, wherein the charging or fueling system is further caused to receive location information of a charging or fueling port of the CA/AD vehicle, expressed in terms of the coordinate system of the CA/AD vehicle; and to translate the location information of the charging or fueling port, expressed in terms of the coordinate system of the CA/AD vehicle, to an expression in terms of the coordinate system of the charging or fueling system, to locate the charging or fueling port of the CA/AD vehicle to charge or fuel the CA/AD vehicle, after aligning the two coordinate systems.

These embodiments may provide at least the following advantages over prior art solutions. With the disclosed technology, many layouts of external charging or fueling ports can be accommodated. The disclosed system is able to automatically identify their positions with sufficient accuracy for charging or fueling. In terms of manufacture and deployment, the disclosed solution requires installation of a relatively small number of tags and a controller on the vehicle, which does not add much cost compared with other solutions. Further, the technology may be retrofitted to earlier generations of non-computer assisted driving vehicles.

While in alternate embodiments, the profile of vehicle 102 may be transmitted to charging or fueling system 104 via e.g., an RF arrangement, provision of the profile via optical tags may have an advantage in reducing the potential of interferences. In a typical RF system, where typically the receiver is equipped with a small set of antennas (i.e. 4 antennas), in CamCom the receiver is equipped with potentially millions "antenna receivers", represented each by a camera pixel. In other words, each pixel of the camera receiver can be considered as an antenna receiver. Using this massive antenna system in conjunction with the camera lens system makes extremely difficult for interference between light sources to appear. Only when considering lights collocated or observed from a long distance (depending of their relative distance, the camera pixel size, camera resolution and optical system focal length), interference can be observed (light coming from two different light sources falling into the same pixel). In general LED tags can be considered not collocated and observed from a relatively short distance (i.e. 10 m max), making interference between light extremely unlikely to happen.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. An apparatus, comprising:
a plurality of tags respectively disposed at a plurality of positions on a top surface of a roof of a vehicle having a charging or fueling port, to provide a plurality of reference points in specifying and locating the charging or fueling port; and
a controller disposed in the vehicle to cause transmission of a profile of the vehicle to a charging or fueling system of a charging or fueling station, including location information about the charging or fueling port expressed in reference to the reference points provided by the positions of the plurality of tags;
wherein the charging or fueling system uses at least the location information in the profile about the charging or fueling port expressed in reference to the reference points provided by the positions of the plurality of tags, and detected locations of the plurality of positions of the plurality of tags to determine the location of the charging or fueling port of the vehicle, to charge or fuel the vehicle;
wherein the plurality of tags are optically light emitting.

2. The apparatus of claim 1, wherein the plurality of tags comprise three (3) tags disposed at three (3) corners of the top surface of the roof of the vehicle.

3. The apparatus of claim 1, wherein the information in the profile about the charging or fueling port includes the location of the charging or fueling port expressed in reference to the positons of the tags, and the charging or fueling system uses at least the location of the charging or fueling port expressed in reference to the positons of the tags, and the plurality of positions of the plurality tags to determine the location of the charging or fueling port of the vehicle in free space, to charge or fuel the vehicle.

4. The apparatus of claim 1, wherein the profile of the vehicle includes a tilt measure of the vehicle, and the charging or fueling system uses at least the tilt measure of the vehicle, and the plurality of positions of the plurality of tags to determine the location of the charging or fueling port of the vehicle in free space, to charge or fuel the vehicle.

5. The apparatus of claim 4, further comprising one or more inertia sensors coupled to the controller to generate inertia data for the controller to determine the tilt measure of the vehicle.

6. The apparatus of claim 1, further comprising a computer-assisted or autonomous driving system, and the controller is part of the computer-assisted or autonomous driving system.

7. The apparatus of claim 6, wherein the apparatus is the vehicle.

8. The apparatus of claim 1, wherein the plurality of tags comprise optical tags.

9. The apparatus of claim 8, wherein the plurality of optical tags are light emitting diode (LED) tags.

10. The apparatus of claim 8, wherein the controller uses the optical tags to transmit the profile of the vehicle, including the information about the charging or fueling port to the charging or fueling system of the charging or fueling station.

11. A charging or fueling system, comprising:
a charging connector or a fueling nozzle;
an imaging device to capture one or more images of a roof of a vehicle, the roof having a top surface and a plurality of tags disposed thereon at a plurality of positions to provide a plurality of reference points for the vehicle to specify and the charging or fueling system to locate a charging or fueling port of the vehicle to charge or fuel the vehicle; and
a controller coupled to the imaging device to receive from the vehicle a profile of the vehicle including location information about the charging or fueling port expressed in reference to the reference points provided by the positions of the plurality of tags;
wherein the controller is to further receive and analyze the one or more images of the roof of the vehicle to determine the plurality of positions of the tags, and use the determined positions of the tags and the location information about the charging or fueling port expressed in reference to the reference points provided by the positions of the plurality of tags, to determine a location of the charging or fueling port of the vehicle, to charge or fuel the vehicle with the charging connector or the fueling nozzle;
wherein the plurality of tags are optically light emitting.

12. The charging or fueling system of claim 11, further comprising one or more receivers to receive the information about the charging or fueling port, from the vehicle.

13. The charging or fueling system of claim 11, wherein the imaging device comprises a camera configured to capture the one or more images of the roof of the vehicle, and wherein sensors of the camera are further configured to optically receive the profile about the charging or fueling port from the vehicle.

14. The charging or fueling system of claim 13, wherein the tags are optical tags, and the camera is configured to optically receive the information about the charging or fueling port from the optical tags of the vehicle.

15. The charging or fueling system of claim 11, wherein the controller is to further adjust a field of view of the imaging device, such that a coordinate system of the charging or fueling system, defined based at least in part on a location or orientation of the field of view of the imaging device, is aligned with a coordinate system of the vehicle defined based at least in part on the positions of the tags.

16. The charging or fueling system of claim 15, wherein the profile of the vehicle further includes a tilt measure of the vehicle, and the controller is to adjust the field of view of the imaging device based at least in part on the tilt measure of the vehicle included with the received profile of the vehicle.

17. The charging or fueling system of claim 15, wherein the controller is to adjust the field of view of the imaging device based at least in part on a misalignment of an actual heading of the vehicle with an axis of the coordinate system defined in the charging or fueling system.

18. The charging or fueling system of claim 15, wherein the controller is to calculate coordinates of the charging or fueling port of the vehicle under the coordinate system of the charging or fueling system, on adjusting the field of view of the imaging device to align the two coordinate systems.

19. The charging or fueling system of claim 18, wherein to calculate coordinates of the charging or fueling port of the vehicle under the coordinate system of the charging or fueling system, the controller is to first calculate coordinates of one of the plurality of tags under the coordinate system of the charging or fueling system, the one tag being the tag that serves as an origin of the coordinate system of the vehicle.

20. The charging or fueling system of claim 19, wherein the information about the charging or fueling port included with the profile includes coordinates of the charging or fueling port expressed in reference to the plurality of tags, and to calculate coordinates of the charging or fueling port of the vehicle under the coordinate system of the charging or fueling system, the controller is to translate coordinates of the charging or fueling port expressed in reference to the plurality of tags, to coordinates under the coordinate system of the charging or fueling system, after alignment of the two coordinate systems.

21. At least one computer-readable medium (CRM) comprising a plurality of instructions, in response to execution of the instructions by a computer-assisted or autonomous driving (CA/AD) system of a CA/AD vehicle, to cause the CA/AD system to transmit a tilt measure of the CA/AD vehicle to a charging or fueling system of a charging or fueling station, wherein the charging or fueling system adjusts an imaging device of the charging or fueling system, based at least in part on the tilt measure, to align a coordinate system of the CA/AD vehicle defined with reference to a plurality of tags on a roof of the CA/AD vehicle, with a coordinate system of the charging or fueling system defined with reference to the imaging device, to automatically locate a charging or fueling port of the CA/AD vehicle to charge or fuel the CA/AD vehicle; wherein the CA/AD system is further caused to transmit location information of the charging or fueling port of the CA/AD vehicle, expressed in terms of the coordinate system of the CA/AD vehicle and in reference to a plurality of reference positions provided by the plurality of tags on the roof of the vehicle to the charging or fueling system of the charging or fueling station; wherein the charging or fueling system translates the location information of the charging or fueling port, expressed in terms of the coordinate system of the CA/AD vehicle to an expression in terms of the coordinate system of the charging or fueling system, after aligning the two coordinate systems; and wherein the charging or fueling system uses the translated location information, expressed in reference to the plurality of reference positions provided by the plurality of tags on the roof of the vehicle to determine and locate the charging or fueling port of the CA/AD vehicle to charge or fuel the CA/AD vehicle;

wherein the plurality of tags are optically light emitting.

22. At least one computer-readable medium (CRM) comprising a plurality of instructions, in response to execution of the instructions by a charging or fueling system of a charging or fueling station, to cause the charging or fueling system to adjust an imaging device of the charging or fueling system to cause a coordinate system of a computer-assisted or autonomous driving (CA/AD) vehicle defined with reference to one or more of a plurality of tags on a roof of the CA/AD vehicle, and a coordinate system of the charging or fueling system defined with reference to an imaging device of the charging or fueling system to be aligned, the CA/AD vehicle to be charged or fueled by the charging or fueling system; wherein the charging or fueling system is further caused to receive from the CA/AD vehicle location information of a charging or fueling port of the CA/AD vehicle, expressed in terms of the coordinate system of the CA/AD vehicle and in reference to a plurality of reference positions provided by the plurality of tags on the roof of the vehicle; and to translate the location information of the charging or fueling port, expressed in terms of the coordinate system of the CA/AD vehicle, to an expression in terms of the coordinate system of the charging or fueling system and in reference to the plurality of reference positions provided by the plurality of tags on the roof of the vehicle, to locate the charging or fueling port of the CA/AD vehicle to charge or fuel the CA/AD vehicle, after aligning the two coordinate system;

wherein the plurality of tags are optically light emitting.

\* \* \* \* \*